United States Patent [19]
Yamagata et al.

[11] Patent Number: 5,874,482
[45] Date of Patent: *Feb. 23, 1999

[54] PLASTIC MOLDED PRODUCT AND METHOD FOR DISPOSAL OF THE SAME

[75] Inventors: Yoshikazu Yamagata, Katano; Takahiko Terada, Nara; Hiroshi Onishi, Hirakata; Fumitoshi Yamashita, Ikoma, all of Japan

[73] Assignee: Matsushita Electric Industrial Co., Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 783,726

[22] Filed: Jan. 16, 1997

[30] Foreign Application Priority Data

Jan. 25, 1996 [JP] Japan ................................. 8-010637

[51] Int. Cl.$^6$ .................................................. C08J 11/16
[52] U.S. Cl. ........................................... 521/48; 528/489
[58] Field of Search .................... 521/48, 48.5; 524/432; 528/488, 489

[56] References Cited

U.S. PATENT DOCUMENTS

| | | | |
|---|---|---|---|
| Re. 31,436 | 11/1983 | South | 523/514 |
| 4,020,035 | 4/1977 | Edwards | 524/492 |
| 4,033,907 | 7/1977 | Wolf | 528/489 |
| 4,056,269 | 11/1977 | Pollitt | 524/432 |
| 4,212,774 | 7/1980 | Idel | 528/488 |
| 4,214,040 | 7/1980 | Meyer | 528/489 |
| 4,362,847 | 12/1982 | Kooijmans | 523/404 |
| 4,427,805 | 1/1984 | Kooijmans | 524/558 |
| 5,026,757 | 6/1991 | Sakon | 524/414 |
| 5,110,861 | 5/1992 | Togami | 524/432 |
| 5,236,134 | 8/1993 | Krawczyk et al. | 241/21 |
| 5,300,546 | 4/1994 | Nelson | 524/432 |
| 5,395,858 | 3/1995 | Schwartz | 528/489 |
| 5,543,444 | 8/1996 | Kobayashi | 523/205 |

FOREIGN PATENT DOCUMENTS

| | | |
|---|---|---|
| 55-155 419 A | 12/1980 | Japan . |
| 56-067 359 A | 6/1981 | Japan . |
| 56-122894 | 9/1981 | Japan . |
| 58-502139 | 12/1983 | Japan . |
| 5-220 440 A | 8/1993 | Japan . |
| 6-49266 | 2/1994 | Japan . |
| 9-059 393 A | 3/1997 | Japan . |
| 2 271 356 | 4/1994 | United Kingdom . |

OTHER PUBLICATIONS

U.S. application No. 08/860,903, Takahiko Terada et al., filed Aug. 14, 1997.

*Primary Examiner*—Paul R. Michl
*Attorney, Agent, or Firm*—Panitch Schwarze Jacobs & Nadel, P.C.

[57] ABSTRACT

A method for disposal of a thermosetting resin containing a material, at least part of which is affected by an alkaline aqueous solution, is disclosed. It comprises at least two steps of including a step of immersing the molded product in an alkaline aqueous solution and a subsequent step of immersing the molded product in water. This method does not require a high temperature as required in a thermal decomposition and does not generate any exhaust gas, and consumes only small energy.

7 Claims, 1 Drawing Sheet

PLASTIC MOLDED PRODUCT AND METHOD FOR DISPOSAL OF THE SAME

BACKGROUND OF THE INVENTION

The present invention relates to a readily disposable plastic molded product and a method for disposal of the same.

Thermosetting plastic molded products have wide applications including architectural, automobile, electric industrial and the like. These products include fiber-reinforced plastics incorporated with glass fiber, carbon fiber, organic fiber and the like, as well as particle-dispersed type plastic molded products incorporated with calcium carbonate, kaolin, talc, mica and the like.

In addition to these, aluminum hydroxide is added as a filler for giving a product a flame-retardant property.

Applications of these plastic molded products are roughly classified into two groups according to their structures, that is, laminated products and cast-molded products. The laminated products for architectural use include waved plates, flat plates, floorings, sidings or wall plates, bath tubs, lavatory tanks, water tanks, wash basins and the like; those for shipbuilding industry include yachts, boats, canoes, fishing boats, hydrofoils and the like; those for automobile industry include automobile bodies, air spoilers, camping trailers and the like; those for railway services include passenger cars, containers, berths, various tanks and the like; those for aero use include radar domes, propellers, ailerons, gliders and the like; those for mining and chemical industries include pipelines, tanks, reaction vessels and the like; those for electrical industry include various insulating plates, printed circuit boards, switch boards, casings, motors, transformers, video tape recorders, audio appliances and the like; those for other use include chairs, suit cases, helmets, surf boards, snow boards and the like. The cast-molded products in the architectural and civil engineering fields include artificial marble, tiles, doors, pipes, mortars, concrete and the like; those in the electric and communication fields include resins for sealing capacitors, coils, connecting terminals and the like; those for other use include buttons, ornaments, tablewares and the like.

Burning down or burying has hitherto been the common method for disposal of the thermosetting plastic molded products, and recycling such as thermal recycling has only partly been performed.

For recycling the molded products including FRP, BMC (bulk molding compound), SMC (sheet molding compound) and the like containing an inorganic substance, investigations are chiefly directed to a method of crushing the product and reusing the crushed powder as the filler by adding it to a virgin material up to about 20%, a method of chemically recycling the product by thermally decomposing it for recovering raw material, and a method of decomposing the product by microwave irradiation. Previously proposed specific measures may be exemplified as an equipment for producing a decomposed oil by crushing, melting and then thermally decomposing the molded product (Japanese Laid-Open Patent Publication Sho 62-32131), an equipment for converting the plastic wastes into oil (Japanese Laid-Open Patent Publication Sho 62-184034), a method for thermally decomposing wastes of glass fiber-reinforced thermosetting resins (Japanese Laid-Open Patent Publication Hei 4-100834), an equipment for disposal of FRP wastes (Japanese Laid-Open Patent Publication Hei 6-234879), and a method for thermally decomposing carbon fiber-reinforced plastics under a specific gas environment (Japanese Laid-Open Patent Publication Hei 6-99160). A crusher such as hammer mill and a heater are used in these methods.

The bulky plastic molded products occupy a large volume. This causes a problem of low efficient storing and transportation after their use. In order to solve the problem, mechanical crushing is usually performed. At present, the mechanical crushing consumes much energy and generates noise and the like. An advent of a technology for easily reducing the volume of the molded product is therefore eagerly required.

The thermosetting plastic molded products are frequently used as structural materials and may contain metals or other foreign matters if used for the molded motor, molded transformer or the like, or for sealing a semiconductor device. These molded components as the plastic molded products containing valuable objects such as metals and semiconductor tips are frequently buried just as they are at their disposal, and recycling of the valuable components and materials contained therein is ignored at present.

Further, crushing, thermal decomposition, decomposition by microwave irradiation and the like, which are methods for recycling FRP, SMC, BMC and the like, require a specifically designed large scale equipment and, in addition, all the methods consume much energy. Although various proposals are made on the thermal decomposition, in particular, a high temperature of not less than 300° C. is required in any case.

BRIEF SUMMARY OF THE INVENTION

The primary object of the present invention is to provide a method for disposal of the plastic molded product which can be performed with ease.

Another object of the present invention is to provide a readily disposable plastic molded product.

The method for disposal of plastic molded product in accordance with the present invention comprises at least two steps including a step of immersing a thermosetting plastic molded product in an alkaline aqueous solution, which contains a material at least part of which is affected by the alkaline solution, and a subsequent step of immersing the molded product in water.

In a preferred mode of the present invention, the above-mentioned material at least part of which is affected by the alkaline aqueous solution is a thermosetting resin, particularly an unsaturated polyester resin.

Since an ester bond in the unsaturated polyester resin is liable to be hydrolyzed, the unsaturated polyester resin is disposable with ease. If an aliphatic polyester resin is added to the unsaturated polyester resin, the resultant unsaturated polyester resin is disposable in a shorter time.

In another preferred mode of the present invention, the above-mentioned material at least part of which is affected by the alkaline aqueous solution is at least one filler selected from the group consisting of zinc oxide, zinc hydroxide and aluminum hydroxide.

After the first immersing step, if a portion of the plastic molded product of which hardness is decreased is removed therefrom and then the subsequent immersing step is performed, the plastic molded product can be disposed more effectively in a shorter time.

In addition, if at least one of the alkaline aqueous solution and water is heated, disposal can be done in a shorter time.

The present invention provides a method for disposal of a plastic molded product comprising a step of immersing a thermosetting plastic molded product containing at least one filler selected from the group consisting of zinc oxide, zinc hydroxide and aluminum hydroxide in an alkaline aqueous solution.

The present invention further provides a plastic molded product comprising a thermosetting plastic molded product containing at least one filler selected from the group consisting of zinc oxide and zinc hydroxide.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
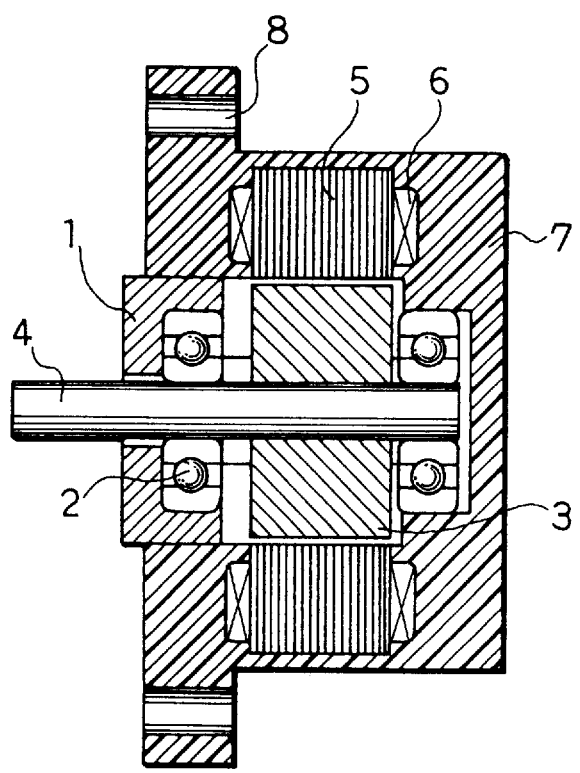
FIG. 1 is a schematic longitudinal cross-sectional view of a molded motor in accordance with an example of the present invention.

In one aspect of the present invention, the thermosetting plastic molded product to be subjected to the disposal process in accordance with the present invention contains at least one member selected from the group consisting of aluminum hydroxide, zinc oxide and zinc hydroxide as the inorganic filler. The content of such inorganic filler is preferably not less than 30 wt % of the whole inorganic filler contained in the plastic molded products in order to decrease the hardness of these molded products during the step of immersing in an alkaline aqueous solution.

In addition, the plastic molded products may further contain another inorganic filler as far as they contain at least one member selected from the group consisting of aluminum hydroxide, zinc oxide and zinc hydroxide. The other inorganic filler may be exemplified as calcium carbonate, calcium silicate, magnesium carbonate, barium sulfate, calcium sulfate, alumina, diatomaceous earth, clay, kaolin, talc, glass beads and the like.

Aluminum hydroxide, zinc oxide and zinc hydroxide are soluble in alkaline aqueous solution. Therefore, if the plastic molded product containing at least one of these as a filler is immersed in the alkaline aqueous solution, the filler is dissolved and the hardness of the product decreases. This promotes penetration or permeation of the alkaline aqueous solution into the plastic molded product and causes its swelling. As a result, the molded product loses its hardness. This makes the plastic molded product crushable with a small force and its volume is reduced with ease. And, crushing-related noise and energy consumption can be decreased. In addition, this method facilitates removal of only the molding material from the molded component as the plastic molded product, thereby to recover the valuable material such as metal or the like contained in the molded component.

Aluminum hydroxide is the conventional inorganic filler. This filler is used to expect its flame retardant and low smoke-producing effects, or, in the case of SMC and BMC for electric appliances, to improve arc-quenching or tracking-resistant property of a product. And, no attention has been given to its alkaline effect to decrease the strength and hardness of the plastic molded product as noted in the alkaline treatment in accordance with the present invention.

Any thermosetting resin may be incorporated in the plastic molded product containing the inorganic filler. The resin may be exemplified as unsaturated polyester resin, epoxy resin, phenolic resin, urea resin, silicone resin, melamine resin, diallyl phthalate resin, polyimide, urethane resin and the like.

The thermosetting resin at least part of which is affected or degraded by the alkaline aqueous solution used in the method in accordance with the present invention is preferably such a resin that contains an ester bond, an ether bond, an amide bond or the like. The resin may be exemplified as unsaturated polyester resin, phenolic resin, diallyl phthalate resin, urethane resin, polyimide resin and the like. Among them, the unsaturated polyester resin is preferable because its decomposing ability can be promoted by the addition of an aliphatic polyester resin.

As the unsaturated polyester resin, any unsaturated polyester resin composed of, as its chief raw materials, an unsaturated polybasic acid, a saturated polybasic acid, and a glycol, can be used.

As the unsaturated polybasic acid, there may be exemplified as maleic anhydride, fumaric acid, itaconic acid and the like.

As the saturated polybasic acid, there may be exemplified as phthalic anhydride, iso-phthalic acid, tele-phthalic acid, tetrahydrophthalic anhydride, methyltetrahydrophthalic anhydride, endomethylene tetrahydrophthalic anhydride, tetrabromophthalic anhydride, adipic acid, sebacic acid and the like.

As the glycols, there may be exemplified as propylene glycol, ethylene glycol, diethylene glycol, dipropylene glycol, neopentyl glycol, dibromoneopentyl glycol, 1, 3-butanediol, 1, 4-butanediol, hydrogenated bisphenol A and the like.

Monomers used as a cross-linking agent for the unsaturated polyester resin may be exemplified as styrene, methyl methacrylate, vinyl acetate, vinyl toluene, α-methylstyrene, methyl acrylate, 2-hydroxyethyl acrylate, 2-hydroxyethyl methacrylate, and the like, and it is preferable to add it to the unsaturated polybasic acid at a molar ratio of 1.3–3.5. If the molar ratio of the monomer to the unsaturated polybasic acid is not more than 1.3, the amount of the unreacted unsaturated polybasic acid becomes excessive, thereby to decrease the strength of the resin and the plastic molded product which contains the resin as its binder. If the molar ratio of the monomer to the unsaturated polybasic acid is not less than 3.5, the penetration or permeation of the alkaline aqueous solution is decreased, and the disposal may sometimes take much time.

As the unsaturated polyester resins, those containing at least one monomer of the above-defined monomers, in particular, 2-hydroxyethyl acrylate or 2-hydroxyethyl acrylate, are preferable. Since these monomers contain a hydrophilic group, when the unsaturated polyester resins cross-linked with these monomers are employed in producing the plastic molded product, the hydrophilic group improves the effect obtained by the treatment with the alkaline aqueous solution and the subsequent treatment with water.

Any aliphatic polyester resin may be used as the resin for constituting the plastic molded product in accordance with the present invention as far as it can easily be decomposed by the alkaline aqueous solution. It may be such a polymer obtained by condensation polymerization of a carboxyl group with a hydroxyl group, or a polymer obtained by ring-opening polymerization of a cyclic ester compound. The polymer may be exemplified as polycaprolactone, polypropiolactone, polycaprolactonediol, polyhydroxy lactic acid, a copolymer of ε-caprolactone with adipic acid and hexamethylenediol, polyethylene malonate, polyethylene succinate, polyethylene glutarate, polyethylene adipate, polyethylene pimelate, polyethylene suberate, polyethylene azelate, polyethylene sebacate, polyethylene decamethylate, polytetramethylene succinate, polypentamethylene succinate, polyhexamethylene succinate, polytrimethylene adipate, polytetramethylene adipate, polyhexamethylene adipate, polytrimethylene sebacate, polytetramethylene sebacate, polyhexamethylene sebacate, polyethylethylene succinate, poly-1, 2-dimethylethylene succinate, polymethylethylne adipate, polymethylethylene sebacate, poly-1-methyltrimethylene succinate, poly-2, 2-dimethyltrimethylene succinate, poly-1-methyltrimethylene adipate, poly-2,2-dimethyltrimethylene adipate, poly-1-methyltrimethylene sebacate, poly-2, 2-dimethyltrimethylene sebacate, polyhexamethylene maleate, poly-cis-2-butene adipate, poly-trans-2-butene adipate, poly-cis-2-butene sebacate, poly-trans-2-butene sebacate, poly-2-butene sebacate, polytetramethylcyclobutane succinate, polytetramethylcyclobutane adipate, polycyclohexylene dimethyl succinate, polycyclohexylene dimethyl adipate, polybutylene adipate, polybutylene succinate, polylactic acid, polyhydroxyvaleric acid, a copolymer of polyhydroxy lactic acid-hydroxyvaleric acid, and the like. It is preferable to add these aliphatic polyester resins in a state of being dissolved in a monomer or an unsaturated polyester resin. If a hard-to-dissolve unsaturated polyester resin is used, it may alternatively be added in a state of being dispersed.

Among the polyester resins, polycaprolactone, polycaprolactonediol and polylactic acid are preferable. These polyester resins are easily hydrolyzed with an alkali.

Since the aliphatic polyester resins can easily be decomposed by the alkaline aqueous solution, the penetration or permeation of the alkaline aqueous solution into the plastic molded product containing the unsaturated polyester resin added with the aliphatic polyester resin is improved. And, since the hydrolysis of the unsaturated polyester resin itself is promoted by the addition, the penetration or permeation of the alkaline aqueous solution is further improved. When the plastic molded product is immersed in water in a state of being penetrated or permeated by the alkaline aqueous solution, a large quantity of water penetrates or permeates into the plastic molded product, thereby to decrease the strength greatly and rapidly and facilitate the disposal.

The plastic molded product containing a resin at least part of which is affected by the alkaline aqueous solution may be constituted only with the resin, but if used as a molding material for the molded component or as an application for FRP, BMC or SMC, it may be incorporated with a reinforcing material such as glass fiber, carbon fiber, an organic fiber, and the like, or with a filler such as calcium carbonate, calcium silicate, magnesium carbonate, barium sulfate, calcium sulfate, kaolin, aluminum hydroxide, talc, mica, diatomaceous earth, glass beads, and the like.

The plastic molded product in accordance with the present invention may further include, in addition to the filler, a reinforcing material, a curing agent, a colorant, a viscosity improver, a mold release agent, and the like.

Glass fibers are mainly used as the reinforcing material but, polyacrylonitrile- or rayon filament-derived, or pitch-derived carbon fiber, an organic fiber such as vinylon, polypropylene, polyester, aramide and the like may also be used.

The curing agent may be exemplified as t-butyl peroctoate, benzoyl peroxide, t-butyl perbenzoate, 2, 2-bis (t-butyl peroxy) butane, 3, 3, 5-trimethyl (t-butyl peroxy) cyclohexane, and the like.

As the colorant, dyes and pigments of general use may be used and may be exemplified as inorganic pigment such as ferric or ferrous oxide, titanium oxide, cadmium yellow, cadmium red, chromium yellow, chromium vermilion, ultramarine and the like, organic pigment such as an azo compound, cyanine blue, chlorinated cyanine blue, cyanine green and the like, dye such as indigo red, oil red and the like, and carbon black. If the recycling of the decomposed product of the treated plastic molded product is considered, it is preferable to use a granular colorant which is insoluble in and easy to separate from the solution used for the treatment of the molded product, such as ferric or ferrous oxide, titanium oxide, carbon black, or the like.

The viscosity improver may be exemplified as magnesium oxide, magnesium hydroxide, calcium hydroxide, a polyhydric isocyanate compound, and the like.

The mold release agent may be exemplified as a fluorine-containing surfactant, zinc stearate, and the like.

The plastic molded product in accordance with the present invention may be a molded component containing a valuable material such as metal. The molded component may be exemplified as molded motors, molded transformers, and resin-sealed semiconductor devices.

The alkaline aqueous solution to be used in the disposal process in accordance with the present invention contains an alkaline alkali metal compound or an alkaline alkaline-earth metal compound. The alkaline alkali metal compound or the alkaline alkaline-earth metal compound may be exemplified as sodium hydroxide, potassium hydroxide, barium hydroxide, sodium ethoxide, potassium butoxide, and the like. If the concentration of these compounds in the alkaline aqueous solution is increased, the dissolution of aluminum hydroxide, zinc oxide or zinc hydroxide is promoted more, or hydrolysis of the resin proceeds due to attacks on the ester bond. However, these compounds at a high concentration may intensify the viscosity of the solution because of increased number of sodium ions or potassium ions in the solution, and the penetration or permeation of the solution into the plastic molded product decreases accordingly. It is therefore preferable to use a solution of an appropriate concentration in order to obtain satisfactory dissolution and hydrolysis, without decreasing the penetration or permeation of the solution into the plastic molded product. Therefore, the concentration of the alkaline alkali metal compound or alkaline alkaline-earth metal compound is preferably not more than 10N, and more preferably 2–7N.

The solution may include these alkaline alkali metal compounds or alkaline alkaline-earth metal compounds as a single component or may include a plurality of these components.

In addition, in order to improve the penetration or permeation of the solution into the plastic molded product, alcohols such as methyl alcohol, ethyl alcohol, and the like, acetone, tetrahydrofuran, ethylene glycol, ethylene glycol monoethyl ether, ethylene glycol dimethyl ether, ethylene glycol diethyl ether, diethylene glycol, diethylene glycol diethyl ether, diethylene glycol dimethyl ether, diethylene glycol monomethyl ether, diethylene glycol monoethyl ether, dimethyl formamide, dimethyl amine, and the like may be added.

Further, since a higher penetrating or permeating rate can be obtained at a high temperature, the solution is preferably heated during the disposal process in a range not exceeding the boiling point of water (100° C. or lower at atmospheric pressure), but in the case where the solution includes an alcohol, a temperature not exceeding the boiling point of the alcohol is preferable. If the filler is zinc oxide or zinc hydroxide, since the solubility of the filler may sometimes be smaller at a high temperature depending on the condition of the solution used in the disposal process, it is preferable to set the condition so as to have a suitable balance between the solubility and the penetrating or permeating rate of the solution.

If the plastic molded product is immersed in water after its immersion in the alkaline aqueous solution, the temperature of the water should be the highest possible temperature within its boiling point and the higher the better.

In the method for disposal in accordance with the present invention, a particular disposal process, including at least once performing a step of immersing in water after immersing in the alkaline aqueous solution, promotes the swelling, softening, crack-development or the like of the plastic molded product and decreases the strength or hardness of the plastic molded product a great deal. If the product is immersed in water in a state of being immersed in the alkaline aqueous solution and a difference in osmotic pressure is created between the solution inside the plastic molded product and the outside water, the water penetrates or permeates into the plastic molded product in a large quantity and the difference in the osmotic pressure disappears, thereby to make the plastic molded product to be easily disintegrated or removed. Therefore, it is possible to easily reduce the volume of the plastic molded product as a waste after use with a small crushing energy and to recover the metals inside the molded component such as molded motor or molded transformer from the component by removing only the molding material. In the case of a plastic molded product containing at least one member selected from the group consisting of aluminum hydroxide, zinc oxide and zinc hydroxide as its inorganic filler, the hardness of the plastic molded product may be decreased a great deal only by immersing it in the alkaline aqueous solution as described above. It is however preferable to perform an immersing step in water after it is immersed in the alkaline aqueous solution in order to shorten the time required for the disposal, to reduce the crushing energy, and to suppress the noise caused by the crushing.

In addition, the water used in this disposal process must be such a water that has a lower ion concentration than that of the alkaline aqueous solution which has already been penetrated or permeated into the plastic molded product by the previous step. The reason for this is that in order to allow the water to penetrate or permeate into the molded product by immersing, it is necessary to create a difference in the osmotic pressure between the solution inside the plastic molded product and the outside liquid.

For that reason, although any water of basic, neutral or acidic nature may be used, the ion concentration in the water is preferably lower than that of the alkaline aqueous solution to be used in the previous step. For instance, deionized water having a low ion concentration is the most preferable but tap water can satisfactorily be used. If crushing or falling off of the molding material is supplemented after the immersing treatment in accordance with the present invention, actually the use of a weak acidic water is preferable to neutralize the alkaline aqueous solution for making such treatment more safe and easier.

Since the hardness of the plastic molded product after the treatment is lowered a great deal, it can be crushed with ease and a pulverized product can be prepared with low energy consumption. The plastic molded product in a wet state can easily be crushed by throwing it in a grinding-type crusher such as grinder, an impact-type crusher such as hammer mill, ball mill, mixer and the like. Since the plastic material in the molded product after the treatment in accordance with the present invention is enough softened to be crushed by hand, the energy consumed in the crushing can be reduced a great deal, compared with the case of producing the pulverized product by crushing using the above-mentioned crusher without the treatment in accordance with the present invention. In that case, in order to avoid coagulation of the pulverized product at drying, the use of a spray-type dryer is preferable. The pulverized product prepared in this manner can be used again as the filler or the like.

In the following paragraphs, the present invention will be described in more detail with reference to its specific working examples.

EXAMPLE 1

Unsaturated polyester resin (EPOLAC, available from Nippon Shokubai Co., Ltd., Japan) was used as the resin of this example. Twelve (12) parts by weight of polystyrene as a low shrinkage agent were added to 100 parts by weight of this resin to obtain a mixture. Three hundred fifty (350) parts by weight of calcium carbonate and 30 parts by weight of glass chopped strand were added to 100 parts by weight of the obtained mixture and then kneaded and cured at 120° C. for one hour. This gave a cylindrical molded product No. 1 having a diameter of 20 mm and a height of 20 mm.

By following the above-mentioned procedure under the same condition except for the substitution of 80 wt % of the above-mentioned calcium carbonate with aluminum hydroxide, zinc oxide and zinc hydroxide, molded products No. 2, No. 3 and No. 4 were produced.

After immersing these four cylindrical molded products in a 5N aqueous solution of sodium hydroxide, the hardnesses of the molded products were measured by a rubber hardness meter (available from Kori Seiki Mfg. Co., Ltd., Japan). Results of the measurements are shown in Table 1 below.

TABLE 1

| Molded body | No. 1 | No. 2 | No. 3 | No. 4 |
| --- | --- | --- | --- | --- |
| Before immersion | 100 | 100 | 100 | 100 |
| After immersion | 97 | 55 | 61 | 63 |

Unit: degree

From the results shown in Table 1, it is appreciated that the hardness of the molded product No. 1 is not less than 95 degrees, and the plastic molded product remains still hard. By contrast, a large decrease in the hardness is observed with the molded products Nos. 2–4. When the hardness drops to this level, the plastic molded product is softened to an extent that it can easily be cut by a stroke of a tooth brush.

Solubilities of the inorganic fillers in the 5N sodium hydroxide aqueous solution are listed in Table 2 below.

TABLE 2

|  | Calcium carbonate | Aluminum hydroxide | Zinc oxide | Zinc hydroxide |
| --- | --- | --- | --- | --- |
| Solubility (wt %) | 0.007 | 3.5 | 2.4 | 2.2 |

It is appreciated that the decrease in the hardness of the molded product becomes large as the solubility of the filler in the alkaline aqueous solution increases. Since calcium carbonate is hard to dissolve in the alkaline aqueous solution, the decrease in the hardness of the molded product is slight, whereas aluminum hydroxide, zinc oxide or zinc hydroxide is soluble in the alkaline aqueous solution, a large decrease in the hardness of the molded product is observed.

In this manner, it is possible to easily reduce the volume of the plastic molded product with a small force.

EXAMPLE 2

In addition to the molded product No. 2 of Example 1, molded products were produced by following the procedure of Example 1 under the same condition except that the substitution ratio by aluminum hydroxide is changed to 30 wt % and 60 wt %.

After immersing these cylindrical molded products in a 5N aqueous solution of sodium hydroxide, the hardnesses of the molded products were measured in the same manner as that in Example 1. Results of the measurements are shown in Table 3 below. For comparison, the result on the molded product No. 1 in Example 1 is also listed in Table 3.

TABLE 3

| Proportion of aluminum hydroxide in the inorganic filler (wt %) | 0 | 30 | 60 | 80 |
|---|---|---|---|---|
| Before immersion | 100 | 100 | 100 | 100 |
| After immersion | 97 | 88 | 66 | 55 |

Unit: degree

As clearly shown in Table 3, with the increase in the proportion of aluminum hydroxide in the inorganic filler, the decrease in the hardness after the alkali immersing treatment becomes large, and in particular, a large decrease is observed when the proportion is not less than 30 wt %.

EXAMPLE 3

In this example, a molded motor was produced by using a molding material of the composition of the molded product No. 2 in Example 1. FIG. 1 shows its schematic longitudinal cross-sectional view.

In FIG. 1, a shaft 4 of a rotor 3 is rotatably pivoted on a bearing 2 provided on a bracket 1. A stator coil 6 comprising enamel coated copper wire is wound on silicon steel plates of a stator core 5 arranged for surrounding the rotor 3 with a gap. The motor is configured by molding the stator core 5, stator coil 6 and the bracket 1 with the above-mentioned molding material 7. In FIG. 1, numeral 8 designates a hole for installation. In this molded motor, the thickness of the molding material is about 4 mm at a thin part and about 10 mm at a thick part.

The molded motor was immersed in a 5N aqueous solution of sodium hydroxide at 100° C. for 100 hours. The hardness of the molding material of the molded motor after the treatment was 35 degrees.

For that reason, when the molded motor after the immersing treatment was taken out from the alkaline aqueous solution, it was possible to remove only the molding material by a single stroke of a brush made of polypropylene and to recover the stator core and the stator coil in their original states.

In this way, according to the method of disposal in accordance with the present invention, it is possible to easily recover the metals inside the molded motor.

EXAMPLE 4

Unsaturated polyester resin (EPOLAC, available from Nippon Shokubai Co., Ltd., Japan), diallyl phthalate resin (STANDLITE, available from Hitachi Chemical Co., Ltd., Japan), and phenolic resin (STANDLITE, available from Hitachi Chemical Co., Ltd., Japan) were used as the three resins of this example, respectively. Three hundred fifty (350) parts by weight of calcium carbonate and 30 parts by weight of glass chopped strand were added to 100 parts by weight of each of the resins to obtain mixtures, and each of the mixtures was then kneaded and cured. This gave cylindrical plastic molded products each having a diameter of 20 mm and a height of 20 mm.

After immersing these three cylindrical molded products in a 5N aqueous solution of sodium hydroxide at 80° C. for 150 hours, they were immersed in tap water at 25° C. for 100 hours. The hardnesses of the molded products at the respective time points were measured in a similar manner to that in Example 1. Results of the measurements are shown in Table 4 below.

TABLE 4

|  | Before treatment | After alkali treatment | After water treatment |
|---|---|---|---|
| Unsaturated polyester resin | 100 | 97 | 58 |
| Diallyl phthalate resin | 100 | 94 | 53 |
| Phenolic resin | 100 | 91 | 49 |

Unit: degree

From the results shown in Table 4, it is appreciated that although all the plastic molded products remain still hard (hardness of not less than 90 degrees) after the alkali treatment, the hardness lowers to 49–58 degrees by the water treatment. Each of the plastic molded products is softened to an extent that it can be cut little by little by a stroke of a tooth brush.

For comparison, the above-mentioned three kinds of molded products were immersed in water at 25° C. or 80° C. for 300 hours. As a result, no decrease in the hardness was observed in any molded products and the hardness remained 100 degrees. Further, the hardness of the molded products after immersing treatment in a 5N aqueous solution of sodium hydroxide at 80° C. for 250 hours was about 90 degrees and the products could not be cut by a stroke of a tooth brush.

These results indicate that alkali immersing treatment causes penetration or permeation of the alkaline aqueous solution into the plastic molded products, but the hardness of the molded products does not change even if the treatment is continued. By contrast, if the plastic molded product is immersed in water in the state of being penetrated by the alkaline aqueous solution, it is possible to promote the swelling, softening, and crack-development of the molding material by the water, thereby to lower the hardness of the product a great deal. By this function, the volume of the plastic molded product can be reduced with ease with a small force.

EXAMPLE 5

Unsaturated polyester resin (EPOLAC, available from Nippon Shokubai Co., Ltd., Japan) was used as the resin of this example. Twelve (12) parts by weight of polystyrene as a low shrinkage agent were added to 100 parts by weight of this resin to obtain a mixture. Three hundred fifty (350) parts by weight of calcium carbonate and 30 parts by weight of glass chopped strand were added to 100 parts by weight of the obtained mixture and then kneaded and cured at 120° C.

for one hour. This gave a cylindrical molded product No. 1 having a diameter of 20 mm and a height of 20 mm.

By following the above-mentioned procedure under the same composition except for the substitution of the polystyrene as the low shrinkage agent with polycaprolactone of an aliphatic polyester resin having a low shrinkage effect, a plastic molded product No. 5 was produced.

In addition, by following the above-mentioned procedure under the same composition except for the addition of 10 parts by weight of polycaprolactonediol to 100 parts by weight of the mixture of EPOLAC and polystyrene, and the addition of polylactic acid having a particle diameter of not more than 30 μm in place of the polycaprolactone in the same proportion, plastic molded products No. 6 and No. 7 were produced.

After immersing in a 5N aqueous solution of sodium hydroxide at 80° C. for 150 hours, these four kinds of cylindrical molded products were immersed in tap water at 25° C. for 80 hours. The hardnesses of the molded products were measured at the respective time points by a rubber hardness meter in a manner similar to that in Example 1. Results of the measurements are shown in Table 5 below.

TABLE 5

| Molded body | Before treatment | After alkali treatment | After water treatment |
| --- | --- | --- | --- |
| No. 1 | 100 | 97 | 57 |
| No. 5 | 100 | 93 | 42 |
| No. 6 | 100 | 90 | 35 |
| No. 7 | 100 | 93 | 43 |

Unit: degree

From the results shown in Table 5, it is appreciated that after the alkali treatment, the hardness of the molded products is not less than 90 degrees and they remain still hard, although, after the treatment with tap water, the hardness is decreased to 35–57 degrees. When the hardness drops to this level, the plastic molded product is softened to an extent that it can easily be cut by a stroke of a tooth brush. The decrease in the hardness of the molded products Nos. 5–7 added with the aliphatic polyester resin is large as compared with that of the molded product No. 1 which contains no aliphatic polyester resin.

For comparison, the above-mentioned four kinds of molded products were immersed in tap water at 25° C. or 80° C. for 300 hours, but no decrease in the hardness was observed in any molded products and the hardness remained 100 degrees. Further, the hardness of the molded products No. 1, No. 5, No. 6 and No. 7 after treatment with a 5N aqueous solution of sodium hydroxide at 80° C. for 250 hours was 93, 85, 84 and 86 degrees, and they were too hard to cut by a stroke of a tooth brush.

EXAMPLE 6

By following the procedure of Example 5 and the composition of the molded product No. 5 except for the substitution of 30 mol % of the styrene with 2-hydroxyethyl methacrylate, a plastic molded product was produced.

After immersing in a 5N aqueous solution of sodium hydroxide at 80° C. for 40 hours, two pieces of the plastic molded product were immersed in tap water, one at 25° C. and the other at 80° C., for 20 hours. The hardnesses of the molded products were measured at the respective time points in a manner similar to that in Example 1. Results of the measurements are shown in Table 6 below.

TABLE 6

|  | Before treatment | After alkali treatment | After water treatment |
| --- | --- | --- | --- |
| In water at 25° C. | 100 | 88 | 28 |
| In water at 80° C. | 100 | 88 | 7 |

Unit: degree

From the results shown in Table 6, it is appreciated that the higher the temperature of the immersing water after the alkali treatment, the larger the decrease in the hardness of the molded products becomes. The hardness not more than 20 degrees is the level where the product can be disintegrated by hand. When the hardness decreases down to this level, the plastic molded product can easily be disintegrated only by stirring the solution.

EXAMPLE 7

By following the procedure of Example 6 under the same condition, a plastic molded product having a diameter of 30 mm and a height of 30 mm was produced and treated as follows.

First, after immersing in a 5N aqueous solution of sodium hydroxide at 100° C. for 20 hours, the plastic molded product was immersed in tap water at 80° C. for 5 hours. After removing a part of the molded product which can be cut by hand, the remaining part was immersed in the 5N aqueous solution of sodium hydroxide at 100° C. for 20 hours, and then further immersed in tap water at 80° C. for 5 hours. At this step, all the remaining part could be disintegrated by hand.

The hardnesses of the molded product at the respective steps are shown in Table 7 below.

TABLE 7

| Before treatment | After alkali treatment (first) | After water treatment (first) | After alkali treatment (second) | After water treatment (second) |
| --- | --- | --- | --- | --- |
| 100 | 82 | 4 | 81 | 4 |

Unit: degree

In this way, by performing a first water treatment after a first alkali treatment, cutting the part whose hardness is decreased enough to be cut off, and then performing a second alkali treatment and a second water treatment on the remaining part, it is possible to efficiently perform the disposal process of a thick plastic molded product even when the penetration of the alkaline aqueous solution is unsatisfactory by one cycle of immersing treatment.

EXAMPLE 8

In this example, a plastic molded product having a length of 20 mm, a width of 12.7 mm and a thickness of 3.2 mm was produced with the same composition as that of the plastic molded product No. 5 of Example 5.

After immersing the molded product in a 5N aqueous solution of sodium hydroxide at 80° C. for 70 hours, the surface of the molded product was flashed with water and the volume of the molded product was measured. Subsequently, the molded product after the alkali treatment was immersed in deionized water, tap water, sodium hydroxide aqueous solutions (four different sodium hydroxide concentrations: 0.1, 1, 5 and 10 wt %), sodium sulfate aqueous solutions (four different sodium sulfate concentrations: 0.1, 1, 5 and 10 wt %) and sulfuric acid aqueous solutions (four different sulfuric acid concentrations: 0.1, 1, 5 and 10 wt %) at 90° C. for 15 hours, respectively, and then the volumes of the immersed molded products were measured in a similar manner. Volumetric increase ratios to the product after the alkali treatment (defined as increase in volume caused by the immersing in various kinds of waters and aqueous solutions to the volume of the molded product at the time of being taken up from the 5N aqueous solution of sodium hydroxide) are listed in Table 8 below.

The volume of the molded product taken up from the 5N aqueous solution of sodium hydroxide was about 1.4 times the initial volume of the molded product. For that reason, the volumetric increase ratios to the initial molded product (defined as the increase in volume after the final treatment to the initial volume of the molded product) are also listed in Table 8 below.

TABLE 8

| Kind of water or aqueous solution | Volumetric increase ratio (times) | |
|---|---|---|
| | To molded product after alkali treatment | To initial molded product |
| Deionized water | 2.26 | 3.16 |
| Tap water | 2.35 | 3.29 |
| 0.1% Sodium hydroxide aqueous solution | 2.23 | 3.12 |
| 1% Sodium hydroxide aqueous solution | 1.61 | 2.25 |
| 5% Sodium hydroxide aqueous solution | 1.15 | 1.61 |
| 10% Sodium hydroxide aqueous solution | 1.01 | 1.41 |
| 0.1% Sodium sulfate aqueous solution | 2.11 | 2.95 |
| 1% Sodium sulfate aqueous solution | 1.60 | 2.24 |
| 5% Sodium sulfate aqueous solution | 1.24 | 1.74 |
| 10% Sodium sulfate aqueous solution | 1.10 | 1.54 |
| 0.1% Sulfuric acid aqueous solution | 1.92 | 2.69 |
| 1% Sulfuric acid aqueous solution | 1.62 | 2.27 |
| 5% Sulfuric acid aqueous solution | 1.40 | 1.96 |
| 10% Sulfuric acid aqueous solution | 1.20 | 1.68 |

Based on the results described above, it is appreciated that if deionized water, tap water and the various 0.1% aqueous solutions are used, the volumetric increase ratio is about 2 times compared with the molded product after the alkali treatment, and about 3 times compared with the initial molded product, regardless of the pH value of the solution.

It is also appreciated that the volumetric increase after the alkali treatment takes place by any liquids, but the increase ratio becomes small gradually with the increase in the concentration of the respective aqueous solutions.

As described previously, the immersing treatment with the alkaline aqueous solution alone is not enough to swell the molded products and increase their volume satisfactorily. However, by subsequently immersing the plastic molded product in a water having a smaller ion concentration than that of the alkaline aqueous solution, the molded product can further be swollen, thereby to decrease the hardness of the molded product, to develop cracks and to facilitate the disposal of the molded product.

EXAMPLE 9

In this example, a molded motor of the same configuration as that of Example 3 was produced with the molding material of the same composition as that of Example 6.

After immersing in a 5N aqueous solution of sodium hydroxide at 100° C. for 50 hours, the molded motor was immersed in tap water at 80° C. for 5 hours. The hardness of the molding material of the molded motor after being immersed in the aqueous solution of sodium hydroxide was 71 degrees, and the hardness after being immersed in tap water was 5 degrees.

For that reason, when the molded motor after the immersing was taken out from water, it was possible to remove only the molding material by hand and to recover the inside stator core and the stator coil in their original states.

EXAMPLE 10

In this example, a molded motor of the same configuration as that of Example 3 was produced with a similar molding material to that of the plastic molded product No. 5 of Example 5, except for the substitution of 30 mol % of the styrene with 2-hydroxyethyl methacrylate and substitution of 80 wt % of the calcium carbonate with aluminum hydroxide.

After immersing in a 5N aqueous solution of sodium hydroxide at 100° C. for 40 hours, the molded motor was immersed in tap water at 80° C. for 3 hours. The hardness of the molding material of the molded motor after being immersed in the aqueous solution of sodium hydroxide was 32 degrees, and the hardness after being immersed in tap water was 6 degrees.

For that reason, even after being immersed in the aqueous solution of sodium hydroxide, the molding material was easily removed by a stroke of a brush made of polypropylene. By further immersing in water the molded motor in this state, the hardness can be made extremely small and, it was possible to completely remove only the molding material by hand. As compared with that of Example 9, the decrease after being immersed in the alkaline aqueous solution is larger and it is possible to remove the molding material at that step and shorten the time required for the treatment.

As described previously, according to the method for the disposal using aluminum hydroxide as the filler, wherein after immersing in an alkaline aqueous solution, the molded product is immersed in water, it is possible to realize a large decrease in the hardness in a short time with higher efficiency and low energy consumption.

The present invention should not be limited to the use of the aqueous solution of sodium hydroxide as the alkaline aqueous solution as disclosed in the previous embodiments, but an aqueous solution of potassium hydroxide or sodium ethoxide may also be used with a similar technical advantage.

In the previous embodiments, although the plastic molded product is stood still while it is immersed in the alkaline aqueous solution or water, the present invention should not be limited to this manner and may include any additional means of, for instance, stirring of the solution, removal of fallen parts by a stroke with a brush to reduce the volume, and the like. In addition, it is also possible to promote the penetration of the solution or the disintegration of the molded product by ultrasonic energy or pressure.

As described previously, by subjecting a thermosetting molded product containing at least one filler selected from the group consisting of zinc oxide, zinc hydroxide and aluminum hydroxide to an immersing treatment with an alkaline aqueous solution, the present invention can cause the zinc oxide or the like to dissolve in the solution, thereby to create a decrease in strength of the plastic molded product, a swelling of the molded product due to penetration or permeation of the solution and to decrease its hardness.

In addition, by immersing a plastic molded product in an alkaline aqueous solution, which contains a material at least part of which is affected by the alkaline aqueous solution, and subsequently immersing the plastic molded product in water, the present invention can decrease the hardness of the plastic molded product a great deal by utilizing a difference in the osmotic pressure between the solution inside the molded product and the outside water.

Therefore, according to the present invention, it is possible to make the plastic molded product be crushed with a small force and to reduce its volume, and, in addition, to remove only the molding material of a molded component containing metals or the like with ease and to recover the inside metals.

The method of disposal in accordance with the present invention does not require a high temperature as required in a thermal decomposition and does not generate any exhaust gas, and since it does not require a large force in crushing, it generates only small noise and consumes only small energy.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A method for disposal of a thermoset plastic molded product, the method comprising the steps of:

(a) immersing said thermoset plastic molded product in an alkaline aqueous solution to promote permeation and penetration of said alkaline aqueous solution into said thermoset plastic molded product, wherein said thermoset plastic molded product comprises a material and at least a part of said material is affected by said alkaline aqueous solution; and (b) immersing said thermoset plastic molded product in water having a lower ion concentration than said alkaline aqueous solution after step (a) to promote swelling and crack development and to decrease hardness and strength of the thermoset plastic molded product; whereby after immersion in water said thermoset plastic molded article generally retains its structure and the hardness and strength of said thermoset plastic molded article is reduced, thereby facilitating disposal of said thermoset plastic molded article by crushing.

2. The method for disposal of a thermoset plastic molded product in accordance with claim 1, wherein said material comprises at least one filler selected from the group consisting of zinc oxide, zinc hydroxide and aluminum hydroxide.

3. The method for disposal of a thermoset plastic molded product in accordance with claim 1, wherein said material comprises an unsaturated polyester resin.

4. The method for disposal of a thermoset plastic molded product in accordance with claim 3, wherein said unsaturated polyester resin is cross-linked with at least one monomer selected from the group consisting of 2-hydroxyethyl acrylate, and 2-hydroxyethyl methacrylate.

5. The method for disposal of a thermoset plastic molded product in accordance with claim 3, wherein said unsaturated polyester resin further comprises an aliphatic polyester resin.

6. The method for disposal of a thermoset plastic molded product in accordance with claim 5, wherein said aliphatic polyester resin is at least one resin selected from the group consisting of polycaprolactone, polycaprolactonediol, and polylactic acid.

7. A method for disposal of a thermoset plastic molded product, the method comprising the step of immersing said thermoset plastic molded product comprising at least one filler in an alkaline aqueous solution to promote swelling and to decrease hardness of said thermoset plastic molded product wherein said at least one filler is selected from the group consisting of zinc oxide, zinc hydroxide, and aluminum hydroxide, and wherein after immersion said thermoset plastic molded product generally retains its structure and the hardness and strength of said thermoset plastic molded product is reduced thereby facilitating disposal of said thermoset plastic molded article by crushing.

* * * * *